United States Patent [19]

Nagano et al.

[11] Patent Number: 4,896,641
[45] Date of Patent: Jan. 30, 1990

[54] IGNITION TIMING CONTROL DEVICE OF INTERNAL COMBUSTION ENGINE

[75] Inventors: Masami Nagano; Takeshi Atago; Junji Miyake; Masahide Sakamoto, all of Katsuta, Japan

[73] Assignee: Hitachi, Ltd., Tokyo, Japan

[21] Appl. No.: 207,540

[22] Filed: Jun. 16, 1988

[30] Foreign Application Priority Data

Jun. 17, 1987 [JP] Japan ................................ 62-149226

[51] Int. Cl.4 ........................................... F02P 5/15
[52] U.S. Cl. ..................................... 123/422; 123/418
[58] Field of Search ................. 123/422, 418, 417, 416

[56] References Cited

U.S. PATENT DOCUMENTS

| 4,232,642 | 11/1980 | Yamaguchi et al. | 123/422 |
| 4,257,377 | 3/1981 | Kinugawa et al. | 123/492 |
| 4,498,438 | 2/1985 | Sato | 123/418 |
| 4,552,110 | 11/1985 | Yoshida et al. | 123/416 |
| 4,586,473 | 5/1986 | Nguyen | 123/419 |
| 4,747,383 | 5/1988 | Kimura et al. | 123/422 |

FOREIGN PATENT DOCUMENTS

| 0163953 | 12/1985 | European Pat. Off. . | |
| 2531145 | 2/1984 | France . | |
| 59-23069 | 2/1984 | Japan | 123/418 |
| 60-159372 | 8/1985 | Japan . | |

OTHER PUBLICATIONS

Patent Abstracts of Japan, vol. 10, No. 385(M-548) [2442], Dec. 24, 1986; JP-A-61-175,267, Aug. 6, 1986.

Primary Examiner—Andrew M. Dolinar
Attorney, Agent, or Firm—Antonelli, Terry & Wands

[57] ABSTRACT

A detection processing of a rotational number of an engine is executed periodically in synchronism with a rotation of the engine. A calculation processing of an ignition timing correction amount (Δ IGN) is executed periodically in every predetermined time independently on the rotational number detection of the engine. After the engine is accelerated, the ignition timing control of the engine is executed based on the ignition timing correction amount.

8 Claims, 5 Drawing Sheets

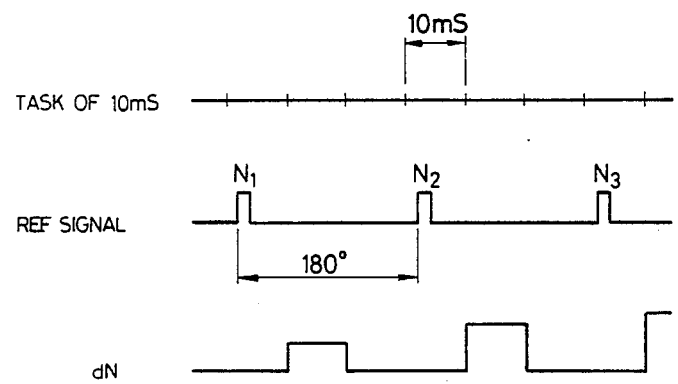

ବ4,896,641

IGNITION TIMING CONTROL DEVICE OF INTERNAL COMBUSTION ENGINE

FIELD OF THE INVENTION

The present invention relates to a control device for an internal combustion engine having an electric ignition system, such as a gasoline engine, and particularly to an ignition timing control device for an internal combustion engine of an automobile for a torque control for preventing a jerky operation on the occasion of acceleration.

BACKGROUND OF THE INVENTION

In an automobile equipped with the gasoline engine, the depression of an accelerator pedal for rapid acceleration is accompanied by a large pulsation of acceleration in the advance direction, so-called acceleration surging, which sometimes brings about a jerky operation.

An ignition timing control device for an internal combustion engine of the prior art is disclosed, for instance, in FIG. 5 of Japanese Patent Laid-Open No. 60-159372 (1985) published on Aug. 20, 1985 entitled "Ignition timing control method of internal combustion engine". The prior art discloses that a retard angle control of a predetermined value is carried out during acceleration, and after that the retard angle is gradually returned to zero with the lapse of time or at each ignition timing of the engine. The method of the prior art aims at reducing the knocking in the acceleration timing. However, the prior art does not consider the jerky operation which will occur after the acceleration. When the retard angle value is greatly increased for improving the jerky operation, the acceleration is damaged, the ignition is failed, and the jerky operation is not prevented.

SUMMARY OF THE INVENTION

An object of the present invention is to furnish an ignition timing control device for an internal combustion engine which is so designed as to enable the sufficient accurate detection of the engine speed by the time control system using a reference signal REF.

The above-stated object is attained by executing the detection of the engine speed independently of the taking-in of this engine speed for the control of ignition timing, and by taking in the engine speed at a prescribed fixed period as apparent from the explanation mentioned later.

According to the present invention, since the engine speed can always be taken in stably at a fixed period without being affected by the variation in the engine speed, the variation in the speed can be detected accurately, the ignition timing control is executed with excellent responsibility, and thus a sufficient torque control can be implemented.

BRIEF DESCRIPTION OF THE DRAWINGS

FIG. 8 illustrates detection of the engine speed according to the prior-art time control system.

DETAILED DESCRIPTION OF THE PREFERRED EMBODIMENT

Figure 2:
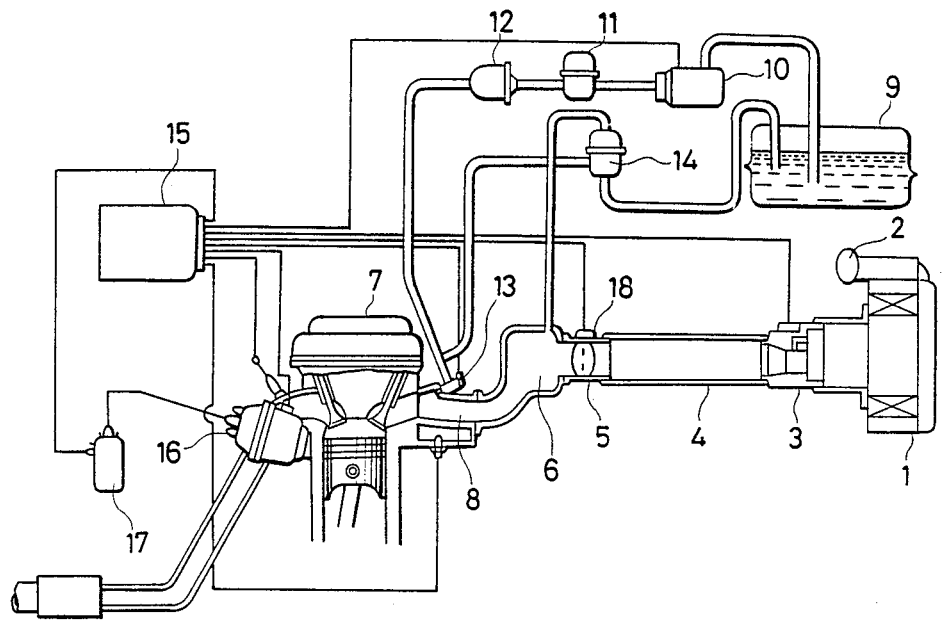
FIG. 2 shows a schematic diagram of one example of an engine system to which one embodiment of the present invention is applied.

Referring to FIG. 2, air to be sucked by an engine enters an inlet 2 of an air cleaner 1, passes through a hot-wire air meter (airflow sensor) 3 detecting the amount of sucked air, a duct 4 and a throttle body 4 having a throttle valve for controlling an airflow, and enters a collector 6. The air is distributed here to suction pipes 8 laid directly through an internal combustion engine 7 and is sucked into a cylinder.

Meanwhile, fuel is sucked from a fuel tank 9 by a fuel pump 10, pressurized thereby and supplied to a fuel system wherein a fuel damper 11, a fuel filter 12, an injection nozzle 13 and a fuel pressure regulator 14 are piped. This fuel is regulated to be of a fixed pressure by said regulator 14 and injected into the suction pipe 8 from the injection valve (injector) 13 provided in said suction pipe 8.

Besides, a detection signal of the amount of sucked air is outputted from the aforesaid airflow sensor 3, and this output is inputted to a control unit 15.

Moreover, a throttle sensor 18 detecting the degree of opening of the throttle valve is fitted to the aforesaid throttle body 15, and a signal from this sensor is also inputted to the control unit 15.

Numeral 16 denotes a distributor, and a crank angle sensor is built in this distributor 16. A reference signal, i.e. REF, is outputted from this sensor and inputted to the aforesaid control unit 15.

Figure 3:
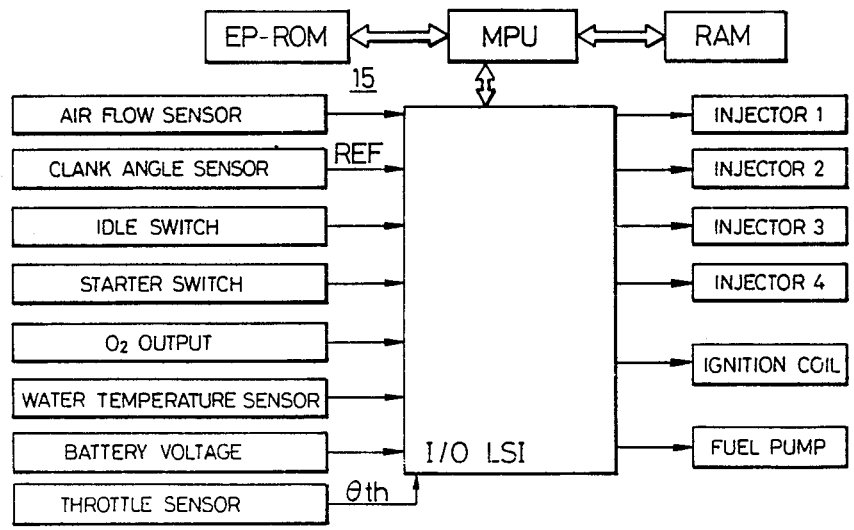
FIG. 3 shows a schematic diagram of a control unit.

FIG. 3 shows the detail of the control unit 15. As is shown in this figure, this unit is constituted by MPU, ROM and LSI comprising an A/D converter and an input-output circuit, and it executes a prescribed arithmetic processing on the basis of the output signals of the sensors shown in FIG. 3, speed sensor, air conditioner switch and electric load switch, and makes the aforesaid injector 13 operator according to an output signal resulting from said arithmetic operation, so that fuel in a necessary amount is injected into each suction pipe 8. In addition, an ignition timing is controlled by sending a signal to a power transistor of an ignition coil 17.

Next, a control operation of one embodiment of the present invention in such a contruction as described above will be explained.

Figure 1:
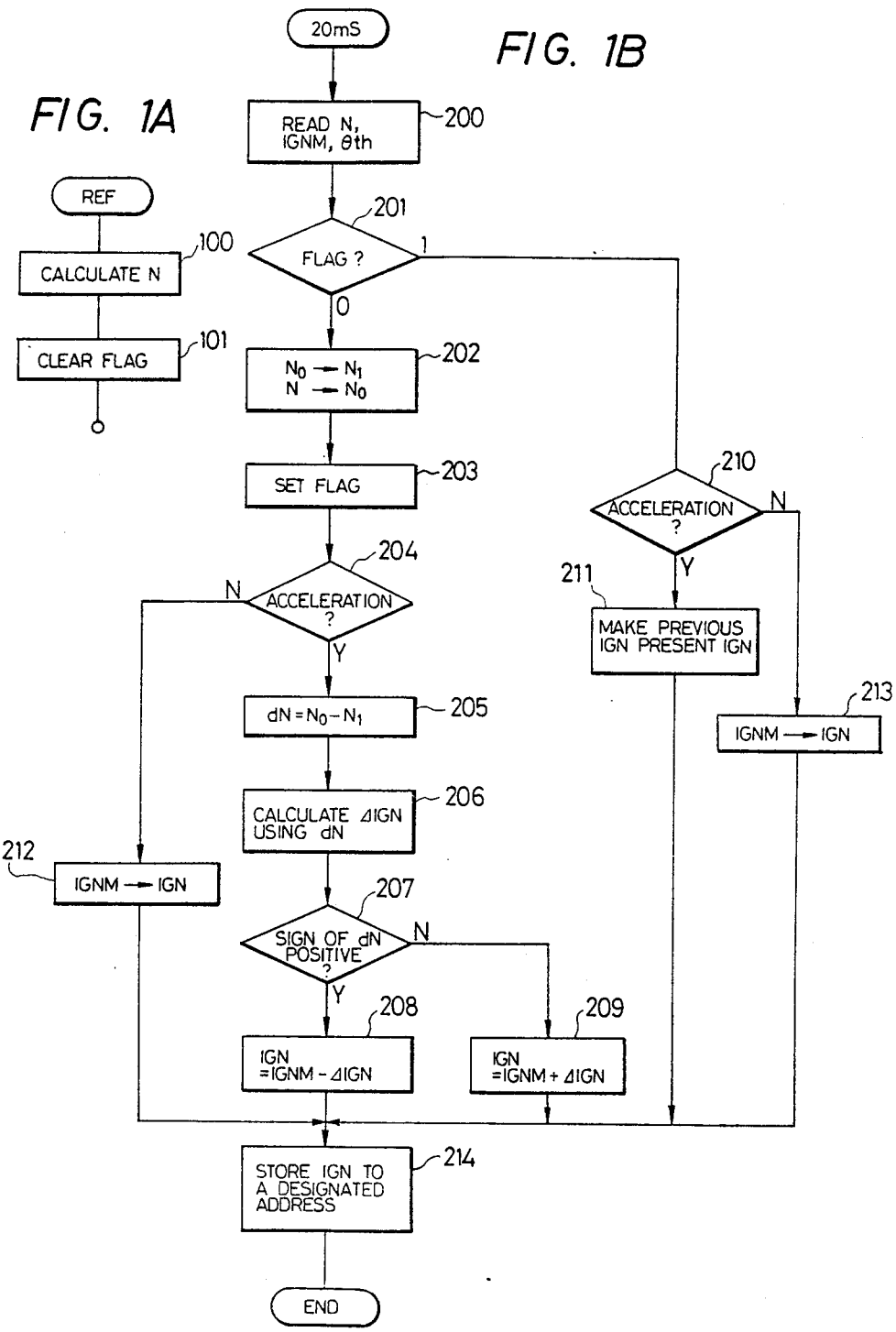
FIGS. 1A and 1B are flow charts showing an operation of an ignition timing control device of an internal combustion engine according to the present invention.

FIG. 1 shows a method of controlling the ignition timing according to one embodiment of the present invention.

The MPU in the control unit 15, which executes various processings required for engine control, is designed to execute a processing for detecting the engine speed as shown in FIG. 1A, independently of a processing for calculating an ignition timing correcton amount shown in FIG. 1B. First, the detection processing of FIG. 1A is executed every time when an interruption is generated in response to the signal REF being produced in synchronization with the revolution of the engine, and the calculation processing of FIG. 1B, on the other hand, is executed repeatedly at a fixed period of 20 ms by timer interruption or the like.

First, a description will be made of the detection processing of FIG. 1A.

Step 100

In this step, the period of reference signal REF is measured and an engine speed N is detected therefrom. Since this processing of FIG. 1A is executed by the interruption generated in response to reference signal REF, the detection of N can be performed easily by measuring the time passing from the time point of the preceding interruption to that of the current interruption.

Step 101

In this step, a clear processing is executed for a prescribed flag prepared when it is found that the speed has changed.

Next, a description will be made of the calculation processing of FIG. 1B.

Step 200

In this step, the respective data on the engine speed N, a basic ignition timing IGNM and a throttle angle $\theta$th are taken in. Out of this data, the engine speed N is found by the above-described processing of FIG. 1A, the basic ignition timing IGNM is obtained by retrieval from a memory map based on a signal of the airflow sensor 3 and the engine speed N of the other processings by MPU, which are not shown in the figure, and further the throttle angle $\theta$th is given by the throttle sensor 18.

Step 201

In this step, the state of the aforesaid flag is examined, and it is judged whether or not the revolution number (speed) of the engine has not changed. When the revolution number of the engine has not changed, the step proceeds to step 210. When the revolution number of the engine has changed the step proceeds to step 202. The flag examined at this time is set in a step 203, which will be described later, and also is reset in the step 101 in the abovedescribed processing of FIG. 1A if the speed again changes. Accordingly, the result of this step 201 becomes "1" on and after the second processing when the processing of FIG. 1B is executed a second time or more prior to the time when the processing of FIG. 1A is repeated after the period of the processing of FIG. 1A becomes 20 ms or above.

Step 202

In this step, a processing is performed wherein data $N_0$ is transferred to data $N_1$ and the engine speed N read in the step 200 (calculated in step 100 of FIG. 1A) is set in the data $N_0$.

Step 203

In this step, when the revolution number of the engine is renewed, the aforesaid flag referred to in step 101 of FIG. 1A) is set. The step proceeds to the next step.

Step 204

In this step, it is examined whether or not the engine is controlled to be in an accelerated state, and judgment on branching is made. More particularly, the judgment may be made from whether or not a difference between a throttle opening $\theta$th read currently and a throttle opening $\theta$th read previously reaches a prescribed value $\Delta\theta$th.

Step 205

In this step, a processing of finding data dN, by determining a difference between data $N_0$ and $N_1$, is executed.

Step 206

Figure 4:
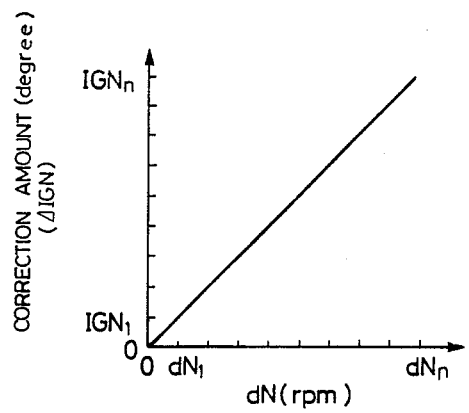
FIG. 4 is a characteristic diagram showing an ignition timing correction amount corresponding to variation amount of an engine revolution number.

In this step, an ignition timing correction amount $\Delta$ IGN is calculated on the basis of a value from retrieval of a table by using the data dN. The table used on the occasion is prepared as shown in FIG. 4.

Step 207

In this step, examination is made to determine whether the sign of the difference data dN is positive or negative, so as to make a judgment on branching.

Step 208

In this step, a processing is made wherein the ignition timing correction amount $\Delta$ IGN is substracted from the basic ignition timing IGNM to calculate an ignition timing IGN to be used for control.

Step 209

In this step, a processing is made wherein the ignition timing correction amount $\Delta$ IGN is added to the basic ignition timing IGNM to obtain the ignition timing IGN for control.

Step 210

In this step, in the same way as in the step 204, judgment on branching is conducted on the basis of the variation rate of the throttle opening $\theta$th.

Step 211

In this step, a processing is made wherein the ignition timing IGN used for the previous control is made to be a current ignition timing IGN as it is.

Steps 212, 213

These steps represent the same processings, in which the basic ignition timing IGMN is made to be the ignition timing IGN as it is.

Step 214

In this step, a processing of storing the ignition timing IGN in a prescribed address of a memory is executed. The data IGN stored in the prescribed address in this way is used for an actual ignition timing control, and thus the ignition timing of the engine is determined by the data IGN.

Next, a description will be made hereunder on the ignition timing control by the execution of the processings shown in FIG. 5 and FIGS. 1A and 1B in one embodiment of the present invention.

First, when the amount of depression of an accelerator pedal is maintained at a fixed value or when the variation rate of the depression amount does not yet reach a prescribed value even with an increase thereof, the result of step 204 or step 210 is N (NO), and therefore step 214 is executed after step 212 or step 213 is executed. Thereby, the ignition timing of the engine is maintained at the basic ignition timing IGNM taken in at step 200, and thus an ignition timing control is in a steady state.

Figure 5:
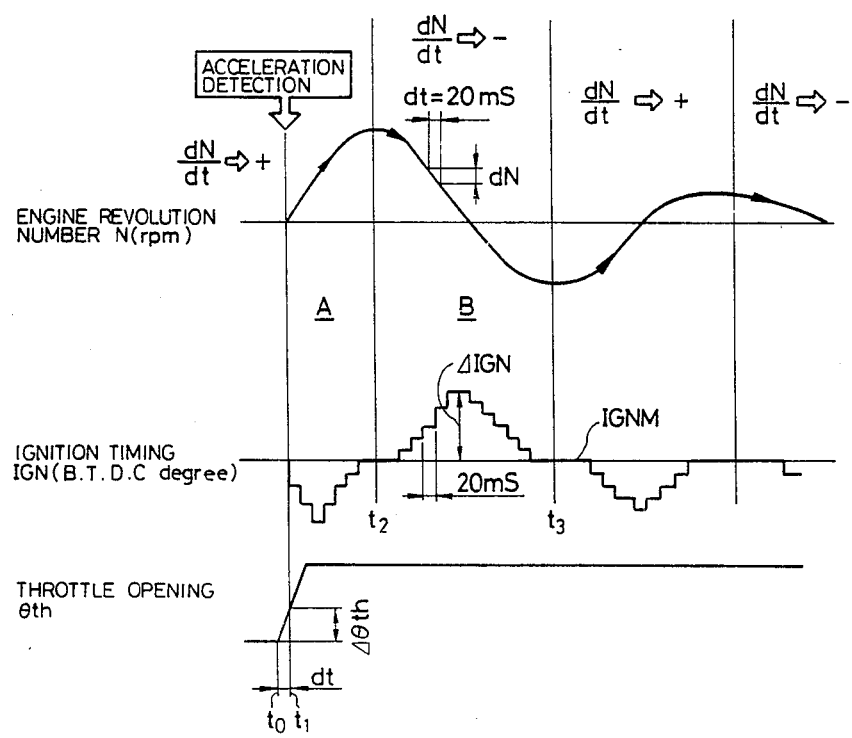
FIG. 5 illustrates an operation of one embodiment of the present invention.

Next, when it is assumed that the depression amount of the accelerator pedal is increased at a time $t_0$ and, as the result, an amount of variation at a time $t_1$ after the dt time (20 ms) exceeds a prescribed value $\Delta\theta$th, as shown in FIG. 5, this is judged to be an acceleration at step 204 or step 210, and the result in the steps is Y (YES). Accordingly, step 214 is executed after the execution of step 208 or step 209, and therefore the ignition timing becomes a modified ignition time IGN at this time.

During a period A from the time $t_1$ to $t_2$, the engine speed N is increasing, and therefore the speed variation rate dN/dt is positive. Consequently, the result at step 207 is Y and step 208 is executed. Thereby, the ignition timing IGN is a value obtained by subtracting the correction amount $\Delta$IGN from the basic ignition timing IGNM, and the ignition timing is put under a retardation control, so as to operate to reduce the engine torque.

During a period B from a time $t_2$ to $t_3$, the engine speed N is decreasing, and therefore the speed variation rate dN/dt is negative. Consequently, the result at step 207 is N and step 209 is executed at this time. Thereby, the ignition timing IGN is a value obtained by adding the correction amount $\Delta$ IGN to the basic ignition timing IGNM, and the ignition timing is accelerated, so as to operate to increase the engine torque.

Figure 6:
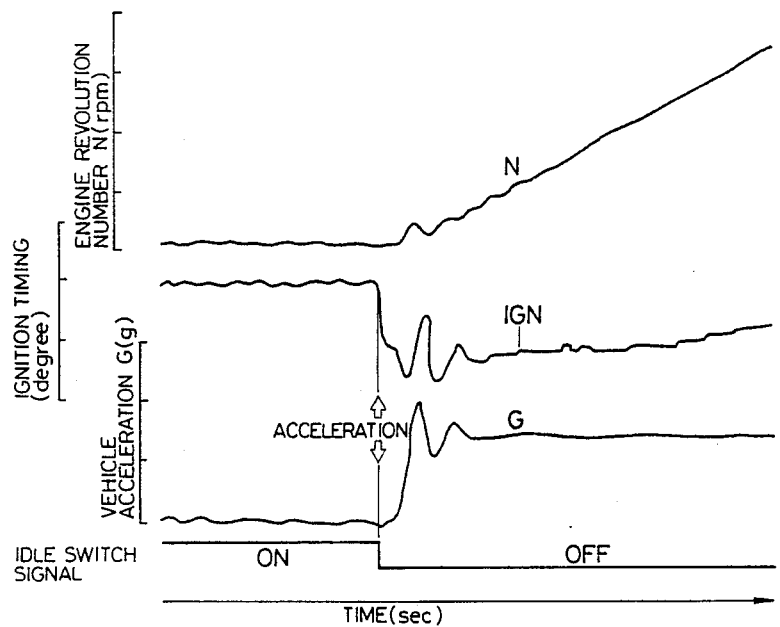
FIG. 6 is a characteristic diagram illustrating an effect of one embodiment of the present invention.

In an engine system of this kind, the engine speed N rises with a periodical variation as shown in FIG. 6 when the throttle valve 5 is opened to perform an accelerating operation. As described previously, this is caused by a phenomenon called acceleration surging.

When the variation in the engine speed N exceeds a certain range and appears continuously to a considerable extent, a so-called jerky operation is brought about.

According to the above-described embodiment, however, a control of modifying the ignition timing to control engine torque in the direction of canceling the variation in the engine speed N is given automatically in response to this variation on and after the time point $t_1$ when the accelerating opertion is detected, as shown in FIG. 5, and thereby the variation in the engine speed N is checked and converged rapidly as shown in FIG. 6. Therefore, the occurrence of the jerky operation can be checked sufficiently.

Figure 7:
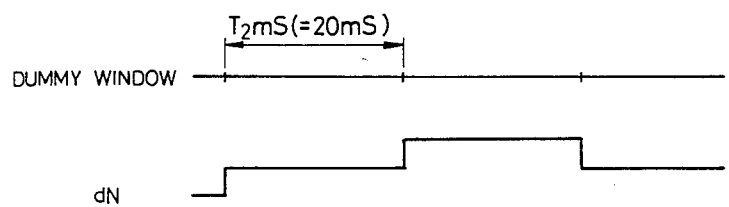
FIG. 7 illustrates detection of an engine speed in the present invention.

A description will be made herein on the detection of the variation amount dN of the engine speed N in the above embodiment. As is shown in FIGS. 1A and 1B, the calculation of this variation dN is implemented by the calculation processing FIG. 1B executed periodically at a fixed time interval (20 ms), independently of the processing of detection of the engine speed by reference signal REF, in this embodiment, and as a result, the data dN can be calculated stably in every window, which is to be called a dummy window of a fixed period $T_2$ ms, for instance, as shown in FIG. 7, thus enabling sufficient checking of the jerky operation as shown in FIG. 6. According to the prior-art time control system using the reference signal REF, in contrast, the revolution number or speed N of the engine is detected by REF interruption, and the variation amount dN is calculated by a task of 10 ms for calculating a fuel injection pulse width. Therefore, results as shown in FIG. 8 are brought about. At a time when the engine speed N is not varied in relation to the ignition timing, the modification of the ignition timing can not be obtained on that occasion, and consequently a torque control necessary and sufficient for checking the jerky operation can not be implemented.

In addition, a sampling time of the revolution number N of the engine is varied in accordance with it and becomes unstable, and after all, satisfactory suppressing of the jerky operation can not be attained by the prior-art time control system.

As is seen from FIG. 1, steps 101, 201 and 203 are provided in the above embodiment, and therefore the preceding ignition timing IGN is used again, as it is, by step 211 when the detection of the engine speed N is delayed. As the result, the modification of the ignition timing is not lost at any time, and accordingly, the jerky operation can be checked further with excellent results.

According to the present invention, the detection of the engine speed is executed independently of the modification of the ignition timing. Therefore, it is possible to furnish easily the ignition timing control device of an internal combustion engine which can implement the modification control of the ignition timing with sufficient accuracy even when the revolution number of the engine is detected only by REF without using POS for detection thereof, and which, consequently, can check the occurrence of the jerky operation at low cost and with sufficiency.

What we claim is:

1. An ignition timing control device for an internal combustion engine having first means for calculating an ignition timing correction amount on the basis of a variation amount of a rotational speed of an engine and second means for effecting a modification of a basic ignition timing on the basis of the ignition timing correction amount calculated by said first means during a period after an engine is subjected to acceleration control,
    wherein said first means includes control means for executing a detection processing of said rotational speed of said engine and a calculation processing of said ignition timing correction amount, independently of each other, in such a manner that the detection processing is executed periodically in synchronization with revolution of said engine, while the calculation processing is executed periodically at a predetermined fixed rate independent of said rotational speed of said engine, and so that said ignition timing correction amount calculated in each calculation processing period is used by said second means until a next detection processing of the rotational speed of said engine is performed.

2. An ignition timing control device of an internal combustion engine in which an ignition timing correction amount is calculated on the basis of a variation amount of a rotational number of an engine and a modification control of a basic ignition timing correction amount during a period after an engine is subjected to an acceleration control, wherein control means is provided for executing a detection processing of said rotational number of said engine and a calculation processing of said ignition timing correction amount, independently of each other, in such a manner that the detection processing is executed periodically in synchronization with revolution of said engine while the calculation processing is executed periodically at every predetermined fixed time, and wherein said ignition timing correction amount calculated in a preceding processing is used again to conduct a modification control when a period of execution of said detection processing becomes larger than a period of execution of said calculation processing.

3. A method of controlling ignition timing of an internal combustion engine, comprising the steps of:
- (a) detecting the speed of the engine periodically in response to a reference signal generated in synchronism with the revolution of the engine;
- (b) changing a flag in memory from a first state to a second state when the detected speed of the engine has changed in comparison to the preceding detected speed;
- (c) reading a value of basic ignition timing, the speed detected in step (a) and a throttle valve opening angle periodically at a predetermined fixed rate independent of the rotational speed of the engine;
- (d) checking the state of said flag each time step (c) is performed;
- (e) if said flag is found to be in the second state in step (d),
    - (e1) setting said flag to the first state,
    - (e2) determining if the engine is in a state of acceleration, and
    - (e3) if the engine is in a state of acceleration, calculating a value of ignition timing by compensating said value of basic ignition timing read in step (c) using an ignition timing compensation factor, and using said value of ignition timing for ignition control;
- (f) if said flag is found to be in the first state in step (d);
    - (f1) determining if the engine is in a state of acceleration, and
    - (f2) if the engine is in a state of acceleration, using a value of ignition timing calculated previously in step (e3) for ignition control.

4. A method according to claim 3, further including the step of:
- (e4) if the engine is not in a state of acceleration, using the value of basic ignition timing read in step (c) for ignition control.

5. A method according to claim 3, further including the step of:
- (f3) if the engine is not in a state of acceleration, using the value of basic ignition timing read in step (c) for ignition control.

6. A method according to claim 3, wherein said step (e3) comprises:
- (i) calculating a change in engine speed dN from successively detected values of engine speed obtained in step (a),
- (ii) obtaining an ignition timing compensation factor based on the calculated change in engine speed dN, and
- (iii) modifying said value of basic ignition timing using said obtained ignition timing compensation factor.

7. A method according to claim 3, wherein said steps (e2) and (f1) comprise:
determining whether the engine is in a state of acceleration by detecting the rate of change of throttle valve opening angle.

8. An ignition timing control device for an internal combustion engine having first means for calculating an ignition timing correction amount on the basis of a variation amount of a rotational speed of an engine and second means for effecting a modification of a basic ignition timing on the basis of the ignition timing correction amount calculated by said first means during a period after an engine is subjected to acceleration control, wherein said first means includes control means for executing a detection processing of said rotational speed of said engine and a calculation processing of said ignition timing correction amount, independently of each other, in such a manner that the detection processing is executed periodically in synchronization with revolution of said engine, while the calculation processing is executed periodically, at a predetermined fixed rate independent of said rotational speed of said engine.

* * * * *